(12) United States Patent
Morris et al.

(10) Patent No.: US 9,464,876 B2
(45) Date of Patent: Oct. 11, 2016

(54) TRAJECTORY MODIFICATION OF A SPINNING PROJECTILE BY CONTROLLING THE ROLL ORIENTATION OF A DECOUPLED PORTION OF THE PROJECTILE THAT HAS ACTUATED AERODYNAMIC SURFACES

(71) Applicants: Joseph P. Morris, Bothell, WA (US); Paul Lichon, Bothell, WA (US); Douglas L. Smith, Bellevue, WA (US)

(72) Inventors: Joseph P. Morris, Bothell, WA (US); Paul Lichon, Bothell, WA (US); Douglas L. Smith, Bellevue, WA (US)

(73) Assignee: General Dynamics Ordnance and Tacital Systems, Inc., St. Petersburg, FL (US)

( * ) Notice: Subject to any disclaimer, the term of this patent is extended or adjusted under 35 U.S.C. 154(b) by 122 days.

(21) Appl. No.: 14/291,450

(22) Filed: May 30, 2014

(65) Prior Publication Data

US 2015/0345909 A1 Dec. 3, 2015

(51) Int. Cl.
| | |
|---|---|
| *F42B 10/62* | (2006.01) |
| *G01S 19/18* | (2010.01) |
| *G01S 19/49* | (2010.01) |
| *F41G 7/22* | (2006.01) |
| *F42B 10/60* | (2006.01) |
| *F42B 10/64* | (2006.01) |

(Continued)

(52) U.S. Cl.
CPC ............... *F42B 10/62* (2013.01); *F41G 7/222* (2013.01); *F41G 7/2293* (2013.01); *F42B 10/60* (2013.01); *F42B 10/64* (2013.01); *G01S 19/18* (2013.01); *G01S 19/49* (2013.01); *F41G 7/226* (2013.01); *F41G 7/2246* (2013.01); *F41G 7/346* (2013.01); *F41G 7/36* (2013.01)

(58) Field of Classification Search
CPC .......... F41G 7/20; F41G 7/22; F41G 7/2246; F41G 7/2253; F41G 7/226; F41G 7/222; F41G 7/2273; F41G 7/2293; F41G 7/34; F41G 7/346; F41G 7/36; F42B 10/60; F42B 10/62; F42B 10/64; F42B 15/01; F42B 10/02; F42B 10/04; F42B 10/06; F42B 10/22; F42B 10/24; F42B 10/32; F42B 10/48; F42B 10/54; G01S 19/01; G01S 19/13; G01S 19/14; G01S 19/18; G01S 19/38; G01S 19/39; G01S 19/42; G01S 19/48; G01S 19/49
USPC ................................................ 244/3.1–3.3
See application file for complete search history.

(56) References Cited

U.S. PATENT DOCUMENTS

| | | | | |
|---|---|---|---|---|
| 4,964,593 A | * | 10/1990 | Kranz | ..................... F42B 10/64 244/3.23 |
| 5,037,040 A | * | 8/1991 | Goltz | ..................... F41G 7/2253 244/3.22 |

(Continued)

FOREIGN PATENT DOCUMENTS

FR 2828276 A1 * 2/2003 ........... F41G 7/2253

*Primary Examiner* — Bernarr Gregory
(74) *Attorney, Agent, or Firm* — Shutts & Bowen LLP

(57) ABSTRACT

An apparatus and system for controlling the trajectory of a projectile having two rotationally decoupled sections, wherein the first section is rotationally decoupled from the second section. The first section of the projectile contains a navigation system. The first section also contains an actuator by which aero-control surfaces on the second section are actuated. The second section may have external aero-spin surfaces which provide a torque counter to the rotation of the base projectile. The apparatus and system also includes embodiments having applications for nose sections of projectiles.

20 Claims, 5 Drawing Sheets

(51) Int. Cl.
  *F42B 10/00*     (2006.01)
  *F41G 7/34*      (2006.01)
  *F41G 7/36*      (2006.01)

(56) References Cited

U.S. PATENT DOCUMENTS

| | | | | |
|---|---|---|---|---|
| 5,139,216 A * | 8/1992 | Larkin | F42B 10/62 | 244/3.1 |
| 5,164,538 A * | 11/1992 | McClain, III | F42B 10/24 | 244/3.23 |
| 5,393,012 A * | 2/1995 | Dunn | F42B 10/64 | 244/3.21 |
| 5,593,109 A * | 1/1997 | Williams | F42B 10/64 | 244/3.21 |
| 5,775,636 A * | 7/1998 | Vig | F42B 10/64 | 244/3.21 |
| 6,364,248 B1 * | 4/2002 | Spate | F42B 10/62 | 244/3.21 |
| 6,869,044 B2 * | 3/2005 | Geswender | F42B 10/06 | 244/3.1 |
| 7,083,139 B2 * | 8/2006 | Broekaert | F41G 7/2293 | 244/3.11 |
| 7,163,176 B1 * | 1/2007 | Geswender | F42B 10/64 | 244/3.1 |
| 7,354,017 B2 * | 4/2008 | Morris | F42B 10/54 | 244/3.1 |
| 7,963,442 B2 * | 6/2011 | Jenkins | F42B 15/01 | 244/3.1 |
| 8,119,959 B1 * | 2/2012 | Ransom | F42B 10/62 | 244/3.1 |
| 8,319,164 B2 * | 11/2012 | Martinez | F42B 15/01 | 244/3.21 |

* cited by examiner

TRAJECTORY MODIFICATION OF A SPINNING PROJECTILE BY CONTROLLING THE ROLL ORIENTATION OF A DECOUPLED PORTION OF THE PROJECTILE THAT HAS ACTUATED AERODYNAMIC SURFACES

BACKGROUND OF THE INVENTION

The present invention relates to a system, method and apparatus for the control of a projectile. It applies particularly to a system, method and apparatus incorporating a device for controlling roll orientation of a decoupled portion of a projectile and will be described with particular reference thereto.

SUMMARY OF THE INVENTION

The optimization of two dimensional course correction for a projectile requires a solution that is effective, has low cost, weight and power consumption. This is true for the design of a new projectile as well as the retrofit of an existing one.

This invention relates to a Roll Control Actuated Canard (RCAC) system which provides more capability of trajectory correction over that of a Roll Control Fixed Canard (RCFC) system such as that described in U.S. Pat. No. 7,354,017 by allowing fixed canards of the prior art to be articulated. This articulation can be used in different flight regimes to increase range and provide course correction tailored more to the flight conditions during flight.

This invention has the advantage of a very small, low power and simple method of roll control for a guidance section of a projectile. The absence of high speed multiple control actuators on the asymmetric aero-surfaces reduces power consumption, cost and complexity.

This RCAC system has measurable advantages over the RCFC system. The RCAC system includes simple spin control with a magnetic friction brake or proportional brake and a light weight control collar and also includes additional capability with a relatively small increase in complexity.

In addition the RCAC mechanism may be used as a collar around the projectile or as a nose enclosing section.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

An apparatus and system for controlling the trajectory of a projectile is disclosed herein.

Figure 1:
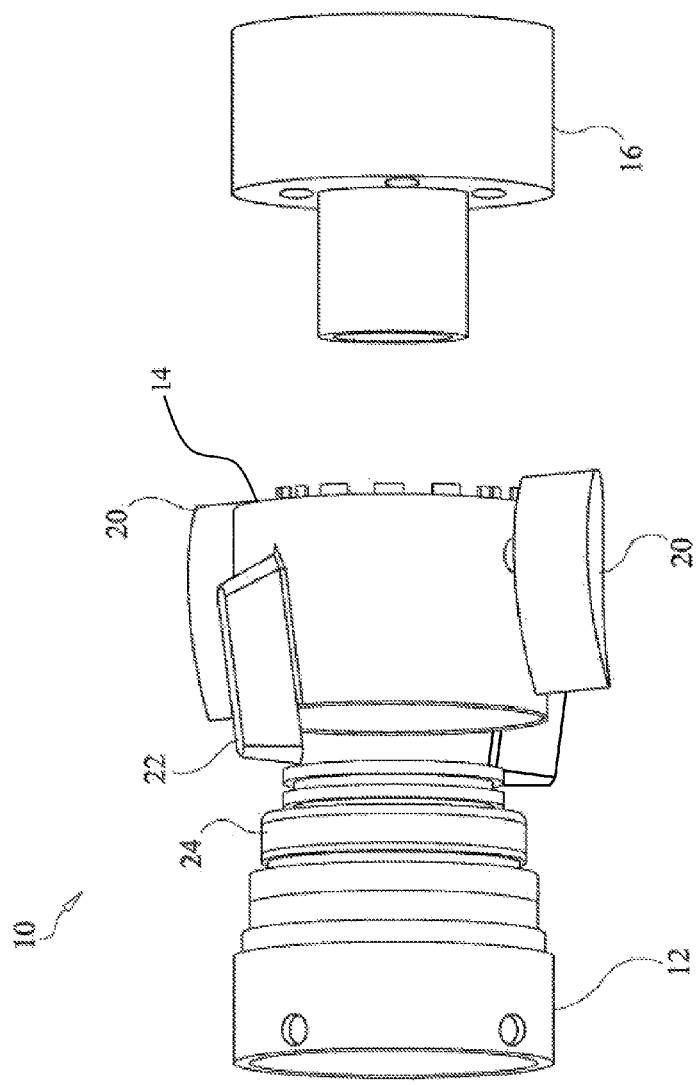
FIG. 1 is an exploded diagram of the roll control actuated canard guidance system.
Figure 2:
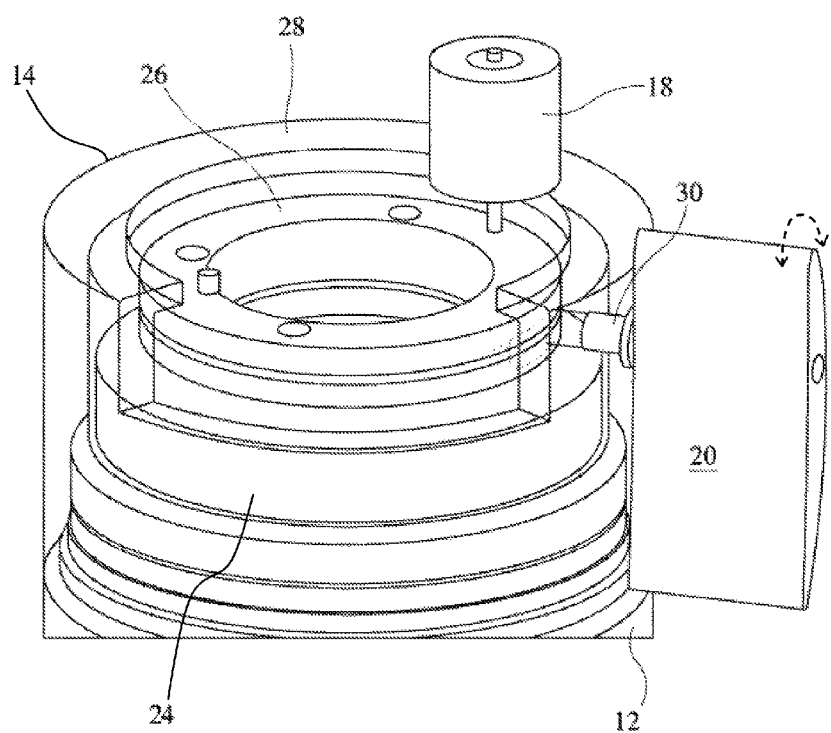
FIG. 2 is a partial diagram of system of the invention showing the lever arm and aero-control surfaces with the track of the system.
Figure 3A:
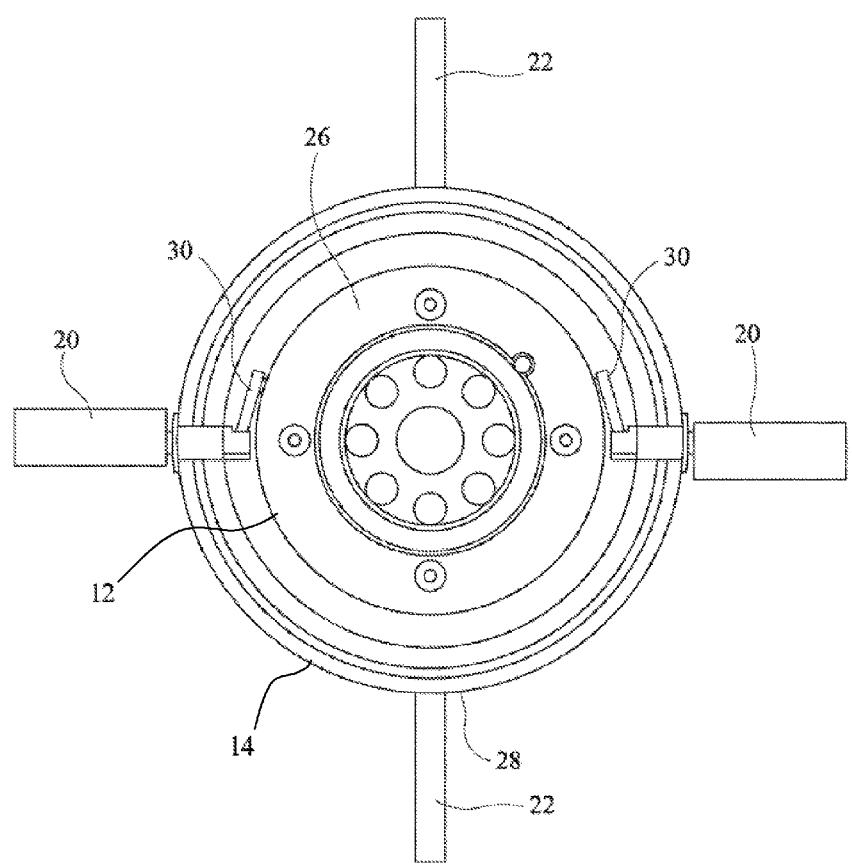
FIG. 3A is a top view diagram of the housing of the brake, track, lever arms and aero control surfaces of the system of the invention.
Figure 3B:
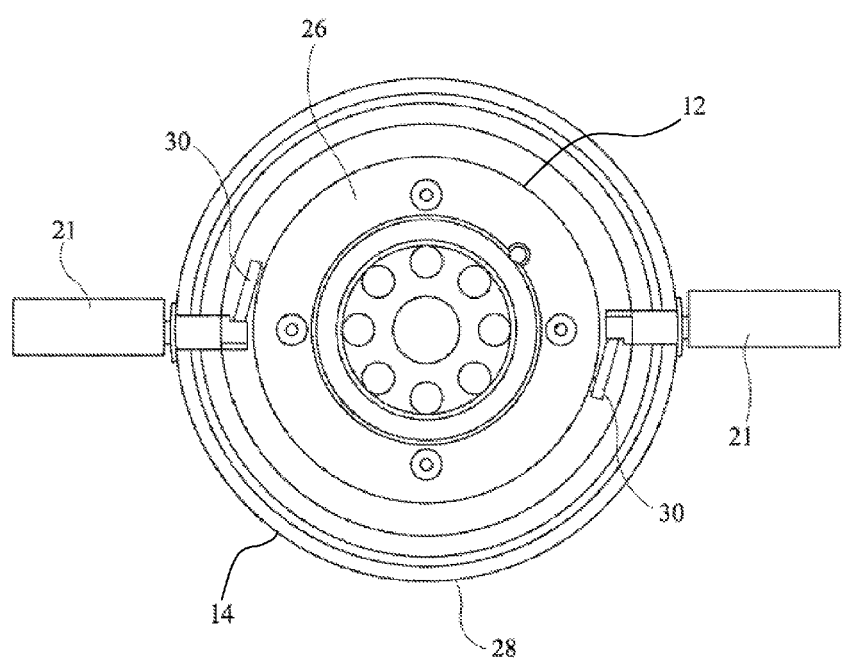
FIG. 3B is a top view diagram of the housing of the brake, track, and lever arms of the system of the invention.

In one embodiment, as shown in FIGS. 1-3, the apparatus 10 includes two sections—a first section 12 and a second section 14. The first section 12 of the apparatus 10 may contain a navigation/targeting system containing section 16. The navigation/targeting system may include a Global Positioning System (GPS) or Inertial Navigation System (INS), or both, that can determine the trajectory of the projectile. The navigation/targeting system may also or alternatively include a semi-active laser seeker that can be used to provide a target location relative to the projectile. The first section 12 also may contain an aero-control surface actuator section 18. In addition, the first section may be enclosed with the second section to form a nose section on the projectile. This alternative embodiment is further described below.

The second section 14 includes aero-control surfaces 20 which may be deployed or deployable and actuated by the aero-control surface actuator section 18 of the first section 12, shown in FIG. 2. One or more of the aero-control surfaces 20 may be asymmetrical. The aero-control surfaces 20 may selectively be made to move about an axis perpendicular to the trajectory of the projectile. As configured in FIG. 3A, the aero-control surfaces 20 are configured to be able to move in the same direction rotating about an axis perpendicular to the trajectory of the projectile. As configured in FIG. 3B, the aero-control surfaces and aero-spin surfaces are combined into aero-control/spin surfaces 21 and are configured to be able to move in opposite directions rotating about an axis perpendicular to the trajectory of the projectile. The navigation/targeting system containing section 16 and the actuator section 18 of the first section 12 may be connected together so that the second section 14 is rotationally decoupled from (i.e., in rotatable connection with) the first section 12.

The second section 14 may also include external aero-spin surfaces 22 or "strakes". In operation the external aero-spin surfaces 22 provide a torque counter to the rotation of the base projectile. These external aero-spin surfaces 22 may alternatively be on the first section 12 and the second section 14.

In addition, the aero-spin surfaces 22 may deployable. Furthermore, they may be actuated and controlled. An actuator may be used to orient the aero-spin surfaces 22 to provide torque on the projectile needed to orient the aero-control surfaces 20 relative to the trajectory of the projectile.

When course correction is no longer needed the actuator may modulate the aero-spin surfaces 22 to a rate that does not appreciable perturb the round.

The use of an external torque on the projectile using aero-spin surfaces provides a compact, low power method to de-spin a portion of a spinning projectile. The aero-spin surfaces in conjunction with aero-control surfaces help maintain the projectile's orientation and provide a bank-to-turn course correction capability and allows for an increased range by orientating for additional lift.

In operation, when trajectory modification of the projectile is desired, the second section 14 may be brought to approximately 0 Hz relative to an Earth inertial frame from its initial rotational speed using a second section brake 24 such as an Electro-Magnetically Actuated (MA) friction brake or a Magneto-Rheological (MR) fluid proportional brake, as described in U.S. Pat. No. 7,412,930, in conjunction with the external aero-spin surfaces 22. Alternatively, the brake 24 may be used independently from the external aero-spin surfaces 22. The brake 24 may be wholly or partially located on the first section 12. The second section 14 is brought to approximately 0 Hz relative spin in an orientation, as may be determined by on-board sensors (e.g., magnetometer, GPS, light sensor), that aligns the aero-control surfaces 20 in an orientation that will affect the appropriate trajectory change. The aero-control surfaces 20 may then be actuated to produce further refinement of the control authority of the trajectory modification aiding in the accuracy and range of the projectile.

When course correction is no longer desired, the second section 14 may be allowed to spin relative to the first section 12 using the external aero-spin surfaces 22 on the second section 14 to a rate where the asymmetric aero-control surfaces 20 do not appreciably perturb the trajectory of the projectile.

As shown in FIG. 2, the first section 12 also may contain an actuator 18 by which aero-control surfaces 20 on the second section 14 are actuated. The actuator 18 may be connected to the track 26 so that the actuator 18 controls the movement of a circular track 26. Alternatively, the actuator 18 may control the movement of a ring 28, whereby movement of the ring may articulate the position of the aero-control surfaces 20. The ring 28 may be located on the second section 14 or as a separate element between the first section 12 and the second section 14.

In one embodiment, at least one lever arm 30 may be located on the second section 14 in connection with an aero-control surface 20. The lever arm 30 may be in movable connection with the aero-control surfaces 20. Alternatively, the lever arm may be a unitary portion of the aero-control surfaces 20. As shown in FIGS. 1 and 2, when the first section 12 and the second section 14 are connected, a first portion of the lever arm 30 may be located on a perimeter of the track 26, so that translation of the track 26 rotates and/or translates the lever arm 30 depending upon the placement of the lever arm. However, other locations of the first portion of the lever arm 30 relative to the track 26 are also contemplated. As shown in FIGS. 2 and 3, movement of the track 26 results in a motion of the lever arm 30. A second portion of the lever arm 30 is attached to the aero-control surfaces 20. Thus, motion of the lever arm 30 results in movement of the aero-control surfaces 20.

In operation, the lever arm is attached to the second section that is rotationally decoupled from the first section. The second section has external aero-spin surfaces which provide a torque counter to the rotation of the first section. The translation of the track 26 of the first section 12 provides associate rotation of the lever arm, which in turn rotates the asymmetric aero-control surfaces 20 producing a change in angle of attack of the projectile in flight. The asymmetric aero-control surfaces 20 may be automatically or selectively deployable.

The navigation system in the first section may control a magnetically actuated brake that orients the asymmetric aero-control surfaces 20 of the second section, which would provide a lateral force to execute course correction of the projectile.

The energy required to rotate the second section relative to the first section during flight is derived from airflow over optional aero-spin surfaces 22. The spin of the second section may be modulated by the brake 24 so that the second section spins at a rate that does not appreciably perturb the flight characteristics of the projectile. Also, the spin of the second section may be modulated by aero-spin surfaces located on the second section 14 and controlled by an actuator on the first section 12.

When a trajectory modification is desired the second section is brought to a position relative to the Earth that aligns the aero-control surfaces in an orientation that will affect the appropriate trajectory change. This change is further refined by rotating the aero-control surfaces to achieve an angle of attack that that optimizes its effect on the trajectory of the projectile.

When course correction is no longer needed the brake may modulate the spin of the second section to a rate that does not appreciable perturb the round.

The use of an external torque such as aero-spin surfaces 22 combined with a magnetic friction brake or proportional brake provides a compact, low power method to de-spin a portion of a spinning projectile or maintain its orientation. This invention further allows the de-spun section to be reoriented to provide a bank-to-turn course correction capability or to increase or decrease range.

In an alternative embodiment, the aero-control surfaces can be deployed in flight or can be integral to the guidance package depending on operational requirements.

Also, the RCAC may be, but is not required to be, incorporated into a new fuzing element of the projectile. The RCAC may be captured between the existing fuze element and the projectile allowing for continued use of the existing fuze.

The actuator used in the system to affect lever arm movement can be mechanical as shown in FIG. 2. Alternatively, the actuator may incorporate a solenoid, stepper motor, electro-active polymer or any such device that creates movement.

In an alternative embodiment, the aero-spin surfaces 22 may be actuated and controlled using an aero-spin surface track and aero-spin surface lever arm system as described for actuation and control of the aero-control surfaces. Alternatively, the actuator for the aero-spin surfaces 22 may incorporate a solenoid, stepper motor, electro-active polymer or any such device that creates movement.

The concept has been investigated for use in 81 mm and 120 mm mortar rounds. In one embodiment of the invention, the existing fuze is replaced with one that contains an electronic navigation system (GPS or INS or a combination of the two), and/or semi-active laser seeker, and the RCAC approach outlined in this disclosure. Alternatively, the system may also be implemented on its own without integrating the fuzing functionality.

Figure 4:
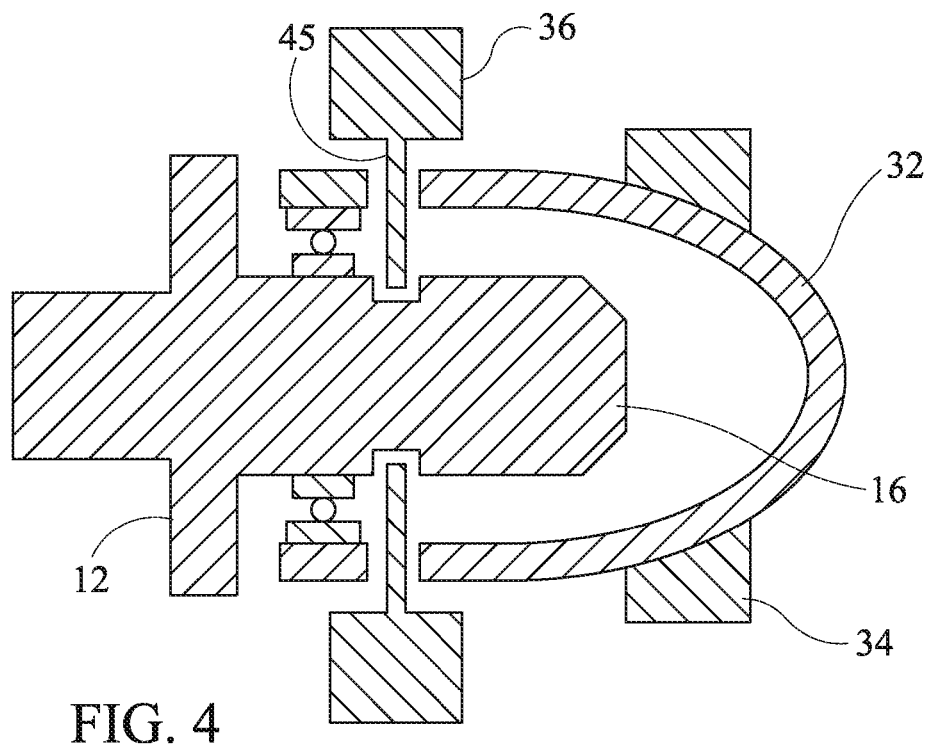
FIG. 4 is partial split diagram of system of an embodiment of the invention having a nose section.

In alternative embodiments, the RCAC is an apparatus for the nose of a projectile. As shown in FIG. 4, the nose section 32 is in rotatable connection with the first section 12. One or more nose aero-spin surfaces 34 may be located on the nose section 32. One or more nose aero-control surfaces 36 are located on the nose section 32. In this embodiment actuation of the nose aero-control surfaces is accomplished in the same manner as described above and shown in FIG. 2. However, as shown in FIG. 4 the nose section 32 may enclose the navigation/targeting system containing section 16 of the first section 12. Furthermore, as shown the nose aero-control surfaces 36 may be controlled by lever arms 45 controlled by an actuator. The lever arms 45 are not required to rotate relative to the nose aero-control surfaces 36.

As with the RCAC embodiment, modulation of the spin of the nose section may be any spin control mechanism known in the art, such as a brake, motor or alternator with a variable resistance load system. In an alternative embodiment, at least part of the mechanism of a brake located in the second section is located in the first section or the nose section. In addition, the guidance system of the embodiment for the nose may reside in the nose section rather than the first section. Any electrical communication to the brake in the first section may occur over a slip ring mechanism or other mechanism for making electrical communication through a rotating mechanical assembly known in the art.

Figure 5:
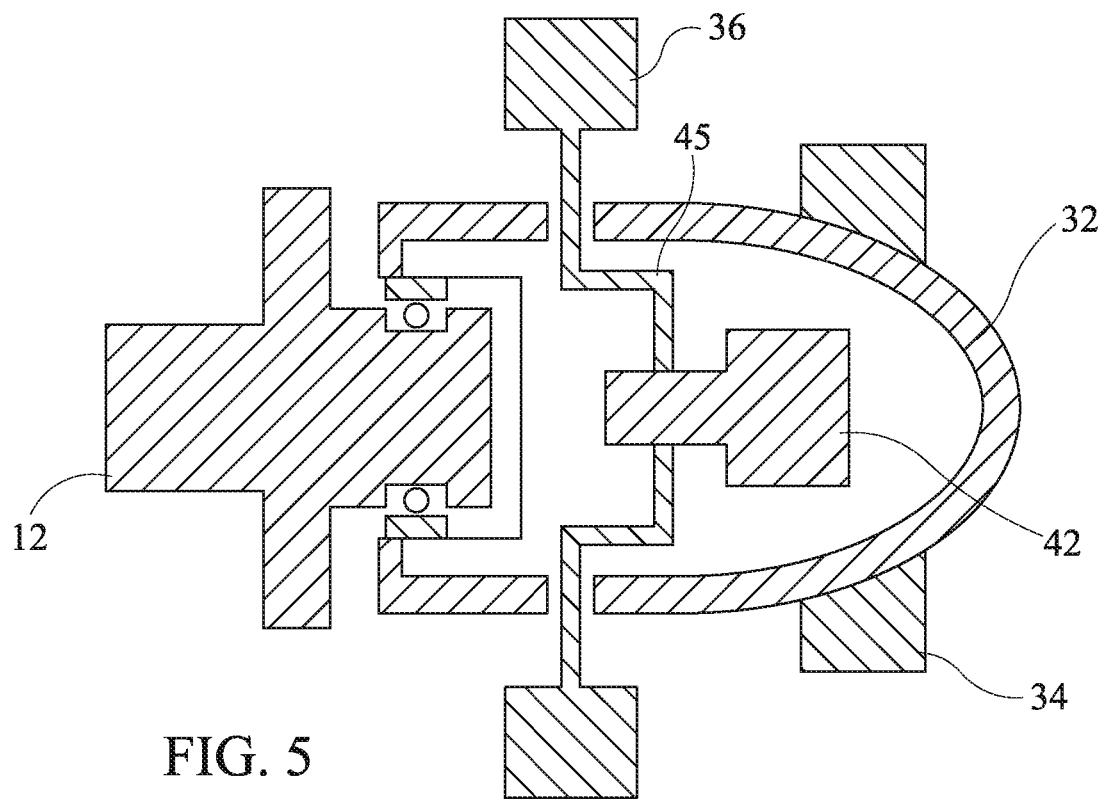
FIG. 5 is partial split diagram of an alternative embodiment of the invention having a nose section.

In another embodiment shown in FIG. 5, electronics 42 including guidance system and control of the nose aero-control surfaces 36 reside in the nose section. Thus, the nose aero-control surfaces 36 are controlled by lever arms 45. The lever arms 45 are not required to rotate relative to the nose aero-control surfaces 36.

Still further advantages of the present invention will become apparent to those of ordinary skill in the art upon reading and understanding the following detailed description of the preferred embodiments. It will be appreciated by persons skilled in the art that the present invention is not limited to what has been particularly shown and described herein above. In addition, unless mention was made above to the contrary, it should be noted that the accompanying drawings are not to scale. A variety of modifications and variations are possible in light of the above teachings without departing from the scope and spirit of the invention.

The invention claimed is:

1. A trajectory control apparatus for a projectile, comprising:
   a first section including
      a navigation/targeting system, and
      an aero-control surface actuator in electronic connection with the navigation/targeting system;
   a second section rotationally decoupled from the first section, having
      an exterior surface, and
      one or more deployed or deployable aero-control surfaces in mechanical connection with the aero-control surface actuator, wherein the aero-control surfaces are rotatable and located on the second section exterior surface, and
   means for de-spinning the second section as the first section spins during the projectile's flight.

2. The trajectory control apparatus of claim 1, wherein the navigation/targeting system includes at least one of a GPS system, an inertial navigation system, an active laser seeker and a semi-active laser seeker.

3. The trajectory control apparatus of claim 1, further comprising one or more aero-spin surfaces located on the exterior surface of the second section.

4. The trajectory control apparatus of claim 1, further comprising one or more aero-spin surfaces located on an exterior surface of the first section.

5. The trajectory control apparatus of claim 4, further comprising additional one or more aero-spin surfaces located on the second section exterior surface.

6. The trajectory control apparatus of claim 1 wherein rotation of the one or more aero-control surfaces is controllable by the navigation/targeting system.

7. The trajectory control apparatus of claim 6, further comprising an aero-spin surface ring rotatable around the projectile located between the first section and the second section, wherein the aero-spin surface actuator is connected to the aero-spin surface ring so that the aero-spin surface ring may translate upon activation of the aero-spin surface actuator.

8. The trajectory control apparatus of claim 1, wherein the means for de-spinning the second section comprises a brake connected to the second section.

9. The trajectory control apparatus of claim 8, wherein at least a portion of the brake is located on or in the first section.

10. The trajectory control apparatus of claim 1, further comprising: a track located in the first section, wherein the aero-control surface actuator is connected to the track so that the track is translatable within the first section upon activation of the actuator.

11. The trajectory control apparatus of claim 1, further comprising: a ring rotatable around the projectile located between the first section and the second section wherein the aero-control surface actuator is connected to the ring so that the ring may translate upon activation of the actuator.

12. The trajectory control apparatus of claim 11, further comprising an aero-control lever arm on the second section in connection with a track and in connection with the aero-control surface.

13. The trajectory control apparatus of claim 12, further comprising a second aero-control lever arm in connection with the ring and in connection with a second aero-control surface.

14. A trajectory control apparatus for a projectile, comprising
   a nose section, having
      an exterior surface, and
      one or more rotatable nose aero-control surfaces located on the exterior surface of the nose section; and
   a first section rotationally decoupled from the nose section, having
      a navigation/targeting system, and
      a nose aero-control surface actuator for actuating the one or more nose aero-control surfaces.

15. The trajectory control apparatus of claim 14, wherein the nose section further comprises nose aero-spin surfaces on the exterior surface of the nose section.

16. The trajectory control apparatus of claim 14 further comprising a brake configured to de-spin the nose section as the first section spins during the projectile's flight.

17. A trajectory control apparatus for a projectile, comprising
   a nose section having an exterior surface and including:
      a navigation/targeting system,
      a nose aero-control surface actuator, and
      one or more adjustable nose aero-control surfaces located on the exterior surface of the nose section; and
   a first section rotationally decoupled from the nose section,
wherein the nose aero-control surface actuator is configured to selectively rotate each of the one or more nose aero-control surfaces to modify a trajectory of the projectile.

18. The trajectory control apparatus of claim 17, wherein the nose section further comprises one or more nose aero-spin surfaces on the exterior surface of the nose section.

19. The trajectory control apparatus of claim 17, wherein the nose aero-control surface actuator and adjustment of the one or more aero-control surfaces are controllable by the navigation/targeting system.

20. The trajectory control apparatus of claim 17 further comprising a brake configured to de-spin the nose section as the first section spins during the projectile's flight.

* * * * *